June 26, 1923.
J. ALLINGHAM
MECHANICAL MOVEMENT
Original Filed Nov. 1, 1918  2 Sheets-Sheet 1
1,459,963
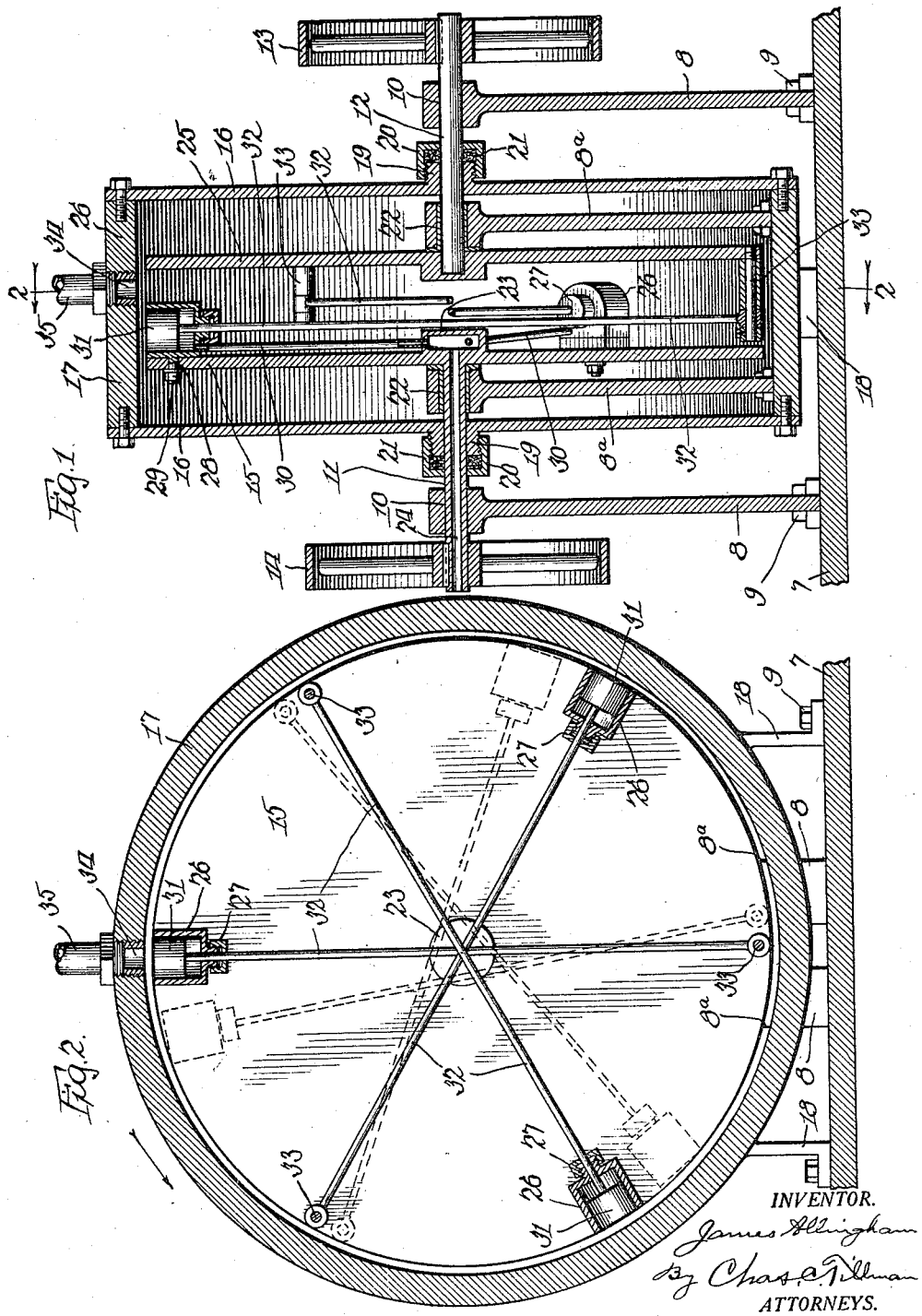
INVENTOR.
James Allingham
By Chas. C. Tillman
ATTORNEYS.

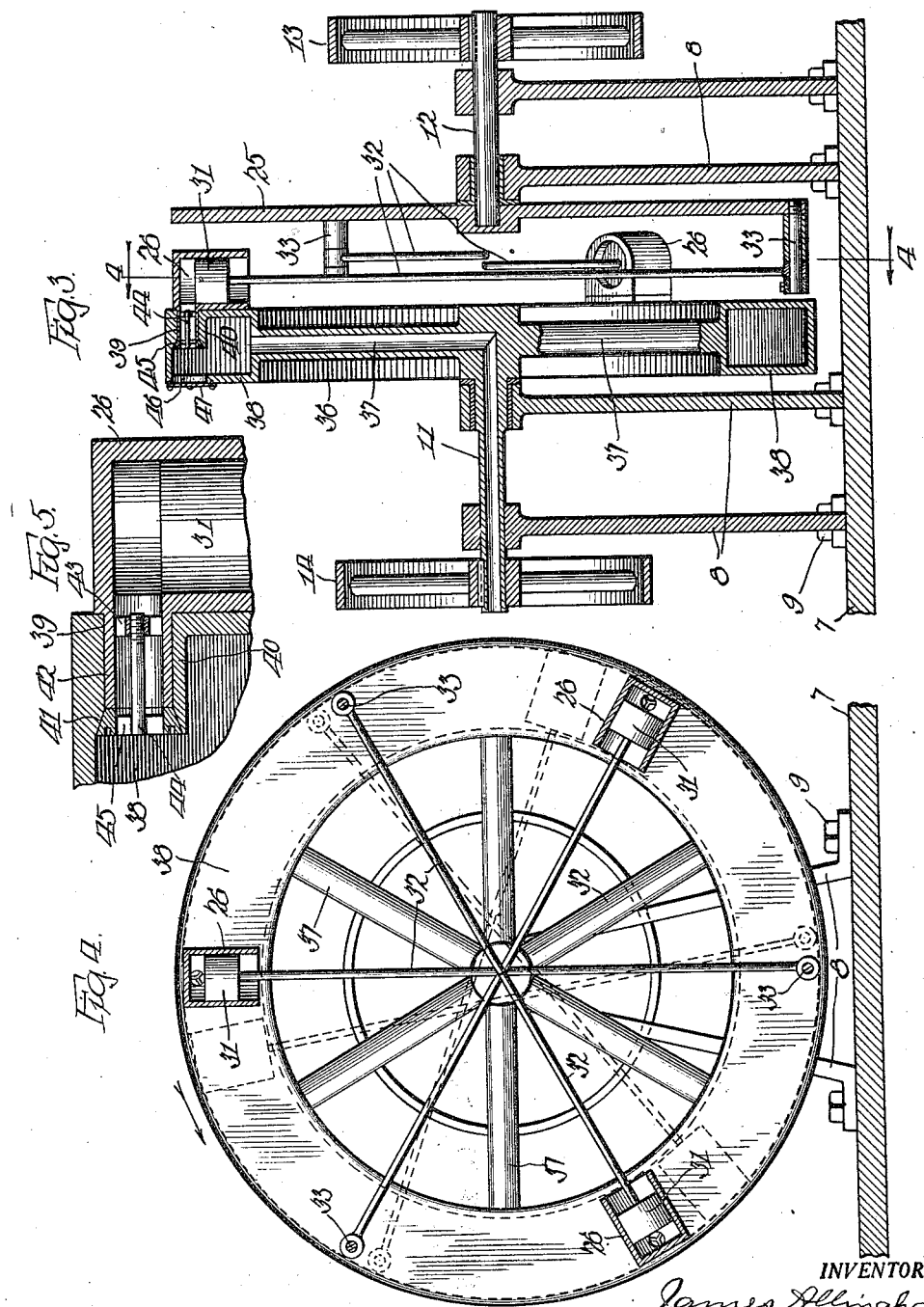

Patented June 26, 1923.

1,459,963

UNITED STATES PATENT OFFICE.

JAMES ALLINGHAM, OF CHICAGO, ILLINOIS.

MECHANICAL MOVEMENT.

Application filed November 1, 1918, Serial No. 260,664. Renewed September 4, 1920. Serial No. 408,307.

*To all whom it may concern:*

Be it known that I, JAMES ALLINGHAM, a citizen of the United States, residing at Chicago, in the county of Cook and State of Illinois, have invented a certain new and useful Mechanical Movement, of which the following is a specification.

This invention relates to improvements in means for the transmission of power and particularly to a new mechanical movement designed for the purpose of transmitting power from one shaft to another for any desired purpose, without the use of gears, belts, or friction devices and it consists in certain peculiarities of the construction, novel arrangement and operation of the various parts thereof as will be hereinafter more fully set forth and specifically claimed.

The main object of the invention is to provide a mechanical movement for the transmission of power, which shall be simple and inexpensive in construction, strong, durable, efficient, and substantially noiseless in operation, the parts of which shall be so made and arranged that they will not likely get out of order in the operation of the apparatus. In other words, my invention has for one of its objects, to provide a power transmitting apparatus without the use of the ordinary gears, belts, pulleys and the like, and without friction, or at least, so that friction will be reduced to a minimum if not entirely dispensed with. Other objects and advantages of the invention will be disclosed in the subjoined description and explanation.

In the accompanying drawings which serve to illustrate an embodiment of the invention, Fig. 1 is a central vertical sectional view through the apparatus or movement showing the parts in the positions they will occupy when at rest, or normally.

Fig. 2 is a vertical sectional view taken on line 2—2 of Fig. 1 looking in the direction indicated by the arrows, showing by continuous lines about the position of the parts shown in Fig. 1, and by dotted lines the initial position the parts will assume in the operation of the device.

Fig. 3 is a similar view to Fig. 1 illustrating a modification in the construction of the movement or apparatus.

Fig. 4 is a vertical sectional view taken on line 4—4 of Fig. 3 looking in the direction indicated by the arrows, and Fig. 5 is an enlarged fragmental sectional view of the outer portion of the drive wheel and one of the cylinders thereon of said modified construction, showing a means of connecting said cylinders to the drive wheel.

Like numerals of reference refer to corresponding parts throughout the different views of the drawings.

Referring now to Figs. 1 and 2 of the drawings, the numeral 7 designates a base upon which the upright standards 8 of the supporting frame are mounted and to which they may be secured by means of screw bolts 9 or otherwise. Each of the uprights 8, which as shown are spaced apart in parallelism, is provided in its upper portion with a transverse opening 10 in one of which uprights is horizontally journalled a hollow drive shaft 11 and in the other of which supports is journalled horizontally in alignment with said drive shaft a line or power transmitting shaft 12 which may have mounted on its outer portion a pulley 13 to which a belt, not shown may be applied for conducting power to a machine (not shown) to be operated by the apparatus. The outer portion of the drive shaft 11 may have mounted thereon a pulley or hand wheel 14 to which power may be applied in any suitable manner for starting or turning the driving disk or wheel 15 which is mounted on the inner portion of the driving shaft 11 in any suitable manner so as to rotate therewith. By reference to Fig. 1 of the drawings, it will be seen and understood, that the shafts 11 and 12 are in a line and have their adjacent ends spaced apart and their adjacent portions extended through suitable central openings in the side walls 16 of a casing, which is designated as a whole, by the reference numeral 17. This casing is preferably circular in shape but may be of any desired form and is fixedly or rigidly mounted between the uprights 8 on standards 18 connected to the peripheral wall of said casing. Each of the side walls of the casing 17 is provided centrally on its outer surface with a screw threaded and apertured extension 19 for the reception of the shafts 11 and 12, and each of said extensions has mounted thereon a stuffing box 20 surrounding said shafts. Each of the stuffing boxes 20 is provided with packing 21 of any suitable kind. As the casing 17 is stationary, it may be desirable to more properly balance or support the shafts 11 and 12 to provide uprights or standards for said shafts in the lower portion of said casing, and in the present instance, I have shown two of such standards 8ª located at their upper ends near the adjacent ends of said shafts and provided with bushing 22 in the opening of each of said standards in which said shafts are journalled. By reference to Fig. 1 of the drawings, it will be seen that the wheel, disk or rotatable element 15 is mounted on the inner portion of the drive shaft 11 and has centrally on its inner surface a compartment or box 23 which has communication with the cavity 24 of the drive shaft 11, which as before stated is hollow. Mounted on the inner end of the line or transmission shaft 12 is a disk, wheel or rotatable element 25 which like the element 15 is fixed to its shaft so as to turn therewith. Each of the elements or wheels 15 and 25 is of less diameter than the internal diameter of the casing 17, so as to rotate therein without frictional contact therewith. The wheel or element 15, is provided on its surface adjacent to the wheel or element 25 with a plurality of equi-distantly disposed cylinders 26, each of which has its outer end open and its inner end closed and provided with a stuffing box 27 of the ordinary or any well known construction. Each of the cylinders 26 is pivotally mounted on the wheel or element 15 near the periphery thereof by means of a pivot 28 extended through a suitable opening in the wheel 15, and a nut 29 engaging the outer end of said pivot. Extended from each of the cylinders 26 to the box or compartment 23 at the center of the wheel 15 is a pipe or tube 30 which may be flexibly or slidably mounted at one of its ends in the cylinder or box 23 between which cylinder and box said tube affords communication or a passage way. Located in each of the cylinders is a piston 31 which has extended from the inner end thereof, through the inner portion of the cylinder, a piston rod 32 which is loosely connected at its other end to a wrist-pin 33 extended inwardly from the wheel or element 25 at a point diametrically opposite the axial line of the piston with which it is connected. From the foregoing and by reference to Figs. 1 and 2 of the drawings, it will be understood and seen that the wrist pins 33 are located equi-distantly apart on the wheel or rotatable element 25, and as before stated at points diametrically opposite the pistons with which they are connected. The casing 17 is provided with an opening 34 which is by preference located in the peripheral wall of the casing at a point between the wheels or elements 15 and 25 as shown in Fig. 1 of the drawings. Fitted or secured in the opening 34 is one end of a pipe 35 which communicates with and leads from a supply of elastic fluid under pressure, which will be termed for the sake of brevity, motive fluid.

In Figs. 3 to 5 inclusive is shown a modification in the construction of the movement or apparatus which consists of the same construction and arrangement of the parts as that shown in Figs. 1 and 2 of the drawings and above described, except that the casing 17 is omitted and that the drive wheel or rotatable element 36 of the modification on the inner portion of the drive shaft 11 is of a different construction from that above described, and also that the means of connecting the cylinders in this modified form of the apparatus to the drive wheel is different from that first above described. In this modification the drive wheel 36 is provided with spokes 37 at least one of which is hollow, see Fig. 3, and communicates at one of its ends with the hollow drive shaft 11 and at its other end with a hollow annulus or rim 38 located at the outer ends of the spokes forming a circular receptacle at the periphery of the wheel 36 to which motive fluid under pressure can be supplied through the drive shaft 11 and one or more of the spokes 37, it being understood that the outer end of the drive shaft may have suitable connection with a source of supply of such fluid. The wall of the hollow annulus or receptacle 38 adjacent to the wheel 25 is provided at suitable points with an opening 39 surrounded by an internal boss 40. Each of these openings has its inner end flared as at 41, see Fig. 5 of the drawings. Located in each of the openings 39 is a neck 42 with which each of the cylinders 26 of the modified construction is provided on its side near its outer end. Each of these necks has therein a spider or cross piece 43 which is provided with a screw threaded opening to receive a bolt 44 extended from an inwardly tapered and apertured plug 45 which is adapted to fit in the flared portion 41 of the opening 39. By this arrangement it is evident that the neck 42 of each of the cylinders 26 can be securely fastened in place on the receptacle 38 yet in such a manner as to permit slight pivotal movement of the cylinder. The opposite wall of the receptacle 38 from that in which the openings 39 are located is provided with an opening 46 in register with each of the openings 39 to permit of access to plugs 45 so that the latter can be tightened up or removed when desired. Each of the openings 46 is tightly closed by a door 47 fastened in any suitable way to the outer wall of the receptacle 38 of the drive wheel. It will be observed that in this modified construction the open ends of the cylinders are presented inwardly instead of outwardly as in the other construction and that the stuffing boxes used in the first described construction are omitted for it will be understood that the motive fluid under pressure will pass from the receptacle 38 through the hollow necks 42 into the cylinders and between their closed ends and the pistons 31 which are connected by means of rods 32 to wrist pins 33 arranged on the wheel or rotatable element 25 in the same manner as shown in Figs. 1 and 2 and above described.

The cylinders may be rigidly secured to the drive wheel, instead of being pivotally mounted thereon, as shown, and in so doing a loose joint may be arranged on each of the piston rods near the stuffing boxes. This would be equivalent to the cylinders having a loose connection with the drive wheel.

While I have illustrated and described an embodiment of the invention in a form of construction for carrying it into effect, yet, this is capable of variation and modification without departing from the spirit of the invention. I, therefore, do not desire to be limited to the precise details of the construction, location and arrangement of the parts as set forth and disclosed, but desire to avail myself of such variations, modifications, arrangements and locations of the parts as come within the scope of the appended claims.

Having described and illustrated the construction and the principal novel features and the purpose of the device, I will now describe its operation, which is as follows:

When a desired pressure is introduced into the container therefor it will be equal on all parts within said container and the drive shaft and line shaft will be located in alignment at the horizontal and vertical center of gravity and each shaft being independently journalled at that point there will be no resistance against a rotative movement of either by virtue of the pressure acting on the rotative elements. It is apparent that the weight of the pressure within the container will be exerted on one end of each of the pistons in proportion to the degree of pressure and the area of the end of the pistons in contact therewith. By means of the piston rods connecting the pistons with the wrist pins on the transmission wheel or element, the weight of pressure on the pistons will be supported by the wrist pins located on the transmission wheel which is journalled with the line shaft. In this normal position the weight or pressure on the pistons will rest on a dead center. When power is applied to the drive shaft the drive wheel and shaft will rotate carrying the piston rods off the dead center thus producing a side thrust on the wrist pins and causing the transmission element to rotate in proportion to the movement of the drive wheel.

In order to prevent any possibility of back pressure in the cylinders 26 when the apparatus is constructed as shown in Figs. 1 and 2 of the drawings and above described, the pipes or tubes 30 which lead from the inner ends of the cylinders 26 to the box or compartment 23 are employed to communicate with the hollow drive shaft 11 for the purpose of an outlet for any fluid that might pass by the pistons into the cylinders by way of leakage.

Having thus fully described my invention, what I claim as new and desire to secure by Letters Patent, is

1. In an apparatus of the class described, the combination with a main frame, of a drive shaft and a line shaft journalled thereon in alignment, a drive wheel on the drive shaft and a transmission wheel on the line shaft, piston carrying cylinders mounted on the drive wheel near its periphery, wrist pins mounted on the transmission wheel near its periphery, rods connecting the pistons and wrist pins in pairs, and means to supply fluid under pressure to said cylinders and against the pistons therein.

2. In an apparatus of the class described, the combination with a main frame, of a drive shaft and a line shaft journalled thereon in alignment with each other, a drive wheel on the drive shaft and a transmission wheel on the line shaft, piston carrying cylinders pivotally mounted on the face of the drive wheel adjacent to said transmission wheel and near its periphery, wrist pins mounted on the transmission wheel near its periphery and extended therefrom towards the power wheel, rods connecting the pistons and wrist pins in pairs, and means to supply fluid under pressure to said cylinders and against the pistons therein.

3. In an apparatus of the class described, the combination with a main frame, of a drive shaft and a line shaft journalled thereon in alignment with each other with their adjacent ends spaced apart, a drive wheel on the drive shaft and a transmission wheel on the line shaft located in parallelism with one another, a piston carrying cylinder pivotally mounted on the face of the drive wheel adjacent to said transmission wheel and near its periphery, a wrist pin mounted on the transmission wheel diametrically opposite the cylinder and extended from said transmission wheel towards the power wheel, a rod loosely mounted at one of its ends on said wrist pin and connected at its other end to said piston, and means to supply fluid under pressure to said cylinder and against the piston thereof.

4. A suitably supported rotatable element, cylinders mounted thereon and arranged for internal elastic fluid pressure, pistons in said cylinders each having one of its ends arranged for contact with said fluid pressure, a second rotatable element mounted in a parallel plane with the first named element, piston rods connected with said pistons and with the second rotatable element and means to supply fluid under pressure to said cylinders and against the pistons therein.

5. A suitably supported rotatable element, cylinders mounted thereon and arranged for internal elastic fluid pressure, pistons in said cylinders each having one of its ends arranged for contact with said fluid pressure, a second rotatable element mounted in a parallel plane with the first named element, piston rods connected with said pistons and with said second rotatable element, means to operate the first named rotatable element and means to supply fluid under pressure to said cylinders and against the pistons therein.

6. In an apparatus of the class described, the combination with a suitably journaled drive shaft, of a drive wheel on said shaft, a cylinder carrying a piston mounted on the drive wheel near its periphery, a suitably journaled line shaft, a transmission member rigidly mounted thereon, means connecting the piston on the drive wheel with the transmission member and means to supply fluid under pressure to said cylinder and against its piston.

7. An apparatus of the class described, consisting of a suitably supported casing, a suitably journaled shaft in the casing, a drive wheel rigidly secured to said shaft and within the casing, a cylinder carrying a piston and mounted on the drive wheel, a suitably journaled line shaft in the casing, a transmission element rigidly secured to the line shaft, means connecting the piston with the transmission element and means to supply fluid under pressure to said cylinder and against its piston.

8. An apparatus of the class described, consisting of a suitably supported elastic fluid pressure container, a suitably journaled drive shaft, a drive wheel rigidly mounted on said shaft within the container, a piston carrying cylinder mounted on the drive wheel, and means connecting the cylinder with the drive shaft for relieving back pressure from the piston.

9. An apparatus of the class described, consisting of an elastic fluid container, a drive shaft suitably journaled and extended into the container, a wheel on said shaft within the container, a cylinder open at one of its ends and mounted near the periphery of said wheel, a piston in the cylinder having one end open for contact with the said elastic fluid, and means connecting the cylinder with the shaft for releasing back pressure from the piston.

10. A suitably supported rotatable element, a piston carrying cylinder mounted thereon and arranged for elastic fluid pressure against one end of said piston, a second element mounted for rotary movement, means for connecting it with the first named element for rotary movement therewith and means to supply fluid under pressure to said cylinder and against its piston.

11. In an apparatus of the class described, the combination with a suitable support, of a drive shaft and transmission shaft journaled thereon, a drive wheel on the drive shaft, a transmission wheel on the transmission shaft, a piston carrying cylinder mounted on the drive wheel near its periphery, means connecting the piston of said cylinder with the periphery of the transmission wheel, and means for supplying elastic fluid pressure through one end of the cylinder and against one end of said piston.

12. In an apparatus of the class described, the combination with a suitable support, of a drive shaft and a transmission shaft journaled thereon, a drive wheel on the drive shaft, a transmission wheel on the transmission shaft, a piston carrying cylinder mounted on the drive wheel near its periphery, means connecting the piston of said cylinder with the periphery of the transmission wheel, and elastic fluid pressure adapted for entrance into the cylinder for coaction with the ends of said pistons.

JAMES ALLINGHAM.

Witnesses:
 Chas. C. Tillman,
 C. Casey.